(12) United States Patent
Larson et al.

(10) Patent No.: US 10,720,698 B2
(45) Date of Patent: Jul. 21, 2020

(54) SYSTEM HAVING A TELECOMMUNICATIONS ELEMENT BEING CONCEALED BY A REFLECTIVE STRUCTURE COMPRISING A POLYMER OPTICAL MULTILAYER FILM

(71) Applicant: 3M INNOVATIVE PROPERTIES COMPANY, St. Paul, MN (US)

(72) Inventors: Donald K. Larson, Cedar Park, TX (US); Craig R. Schardt, Woodbury, MN (US); Stephen C. King, Lakeway, TX (US); Daniel J. Treadwell, Austin, TX (US); Constand E. Yemelong, Austin, TX (US); Joseph C. Carls, Austin, TX (US); Cary A. Kipke, Austin, TX (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/525,364

(22) PCT Filed: Dec. 9, 2015

(86) PCT No.: PCT/US2015/064664
§ 371 (c)(1),
(2) Date: May 9, 2017

(87) PCT Pub. No.: WO2016/094495
PCT Pub. Date: Jun. 16, 2016

(65) Prior Publication Data
US 2017/0373386 A1 Dec. 28, 2017

Related U.S. Application Data

(60) Provisional application No. 62/183,835, filed on Jun. 24, 2015, provisional application No. 62/089,347, filed on Dec. 9, 2014.

(51) Int. Cl.
*H01Q 1/40* (2006.01)
*H01Q 1/44* (2006.01)
(Continued)

(52) U.S. Cl.
CPC ............. *H01Q 1/40* (2013.01); *B32B 3/08* (2013.01); *B32B 27/08* (2013.01); *B32B 27/26* (2013.01);
(Continued)

(58) Field of Classification Search
CPC .... G02B 1/111; C23C 14/0015; H04H 40/27; H01Q 1/40
(Continued)

(56) References Cited

U.S. PATENT DOCUMENTS 4,338,237 A 7/1982 Sulzbach
5,285,002 A 2/1994 Grootaert
(Continued)

FOREIGN PATENT DOCUMENTS

CN 1157929 A 8/1997
JP 2010076201 4/2010
(Continued)

OTHER PUBLICATIONS

"Sweden's Treehotel Mirrorcube", retrieved from the internet on Jul. 4, 2017, URL <http://www.treehotel.se/en/rooms/8-rum/23-the-mirrorcube>, 2017, pp. 1-4.
(Continued)

*Primary Examiner* — Audrey Y Chang
(74) *Attorney, Agent, or Firm* — Daniel J. Iden (57) ABSTRACT

A system having a concealed communications element like a telecommunication antenna is described. More specifically, The system has a communications element that is concealed by a highly reflective multilayer polymer optical film 200. The first element of the multilayer polymer optical
(Continued)

film is a core layer 202 that is made up of a multilayer optical stack. The multilayer optical stack of core layer 202 includes two alternating polymeric layers. The multilayer polymer optical film may optionally also include a protective layer 204 (for example, a hardcoat or an over laminate) that is positioned between the viewer and the core layer. The protective layer 204 may include one or more UV absorbers to aid in durability of the multilayer polymer optical film against UV-degradation. Multilayer polymer optical film 200 may optionally also include an adhesive layer 208 that is positioned between the core layer 202 and a surface onto which the multilayer polymer optical film is to be adhered.

9 Claims, 2 Drawing Sheets

(51) Int. Cl.
| | | |
|---|---|---|
| *B32B 27/36* | (2006.01) | |
| *B32B 27/26* | (2006.01) | |
| *B32B 27/32* | (2006.01) | |
| *B32B 27/08* | (2006.01) | |
| *B32B 27/30* | (2006.01) | |
| *B32B 3/08* | (2006.01) | |
| *H01Q 19/18* | (2006.01) | |
| *G02B 5/08* | (2006.01) | |

(52) U.S. Cl.
CPC .......... *B32B 27/304* (2013.01); *B32B 27/308* (2013.01); *B32B 27/322* (2013.01); *B32B 27/36* (2013.01); *H01Q 1/44* (2013.01); *H01Q 19/18* (2013.01); *B32B 2250/246* (2013.01); *B32B 2255/10* (2013.01); *B32B 2255/20* (2013.01); *B32B 2255/26* (2013.01); *B32B 2264/00* (2013.01); *B32B 2264/10* (2013.01); *B32B 2270/00* (2013.01); *B32B 2274/00* (2013.01); *B32B 2307/416* (2013.01); *B32B 2307/418* (2013.01); *B32B 2307/42* (2013.01); *B32B 2307/554* (2013.01); *B32B 2307/71* (2013.01); *B32B 2307/714* (2013.01); *B32B 2307/732* (2013.01); *B32B 2405/00* (2013.01); *B32B 2457/00* (2013.01); *B32B 2551/00* (2013.01); *B32B 2571/00* (2013.01); *G02B 5/0841* (2013.01)

(58) Field of Classification Search
USPC ............... 343/873; 136/246; 362/217.06; 375/238; 359/361
See application file for complete search history.

(56) References Cited

U.S. PATENT DOCUMENTS

| | | |
|---|---|---|
| 6,352,761 B1 | 3/2002 | Hebrink |
| 6,368,699 B1 | 4/2002 | Gilbert |
| 6,449,093 B2 | 9/2002 | Hebrink |
| 6,456,255 B1 | 9/2002 | Lundahl |
| 6,459,514 B2 | 10/2002 | Gilbert |
| 6,783,349 B2 | 8/2004 | Neavin |
| 6,827,886 B2 | 12/2004 | Neavin |
| 7,836,661 B2 | 11/2010 | LaRue |
| 2004/0134138 A1 | 7/2004 | LaRue |
| 2006/0084780 A1 | 4/2006 | Hebrink |
| 2007/0006909 A1 | 1/2007 | Lewis |
| 2007/0206283 A1* | 9/2007 | Ohtani ............... G02B 1/111 359/488.01 |
| 2009/0283133 A1* | 11/2009 | Hebrink ............... G02B 1/105 136/246 |
| 2011/0273356 A1* | 11/2011 | Kawaguchi ......... C23C 14/0015 343/873 |
| 2013/0230094 A1* | 9/2013 | Eliezer ............... H04H 40/27 375/238 |
| 2015/0037567 A1 | 2/2015 | Clear |
| 2016/0123560 A1* | 5/2016 | Catalano ............ F21V 7/0066 362/217.06 |

FOREIGN PATENT DOCUMENTS

| | | |
|---|---|---|
| JP | 2015164798 | 9/2015 |
| WO | WO 2009-140493 | 11/2009 |
| WO | WO 2009-146227 | 12/2009 |
| WO | WO 2010/008933 A1 | 1/2010 |
| WO | WO 2010/078289 A2 | 7/2010 |
| WO | WO 2011-062836 | 5/2011 |

OTHER PUBLICATIONS

Abstract, "ISO 4892-2:2013 Plastics—Methods of exposure to laboratory light sources—Part 2: Xenon-arc lamps", International Organization for Standardization, 2013, pp. 1-2.

Howell, "Amplitude-only, Passive, Broadband, Optical Spatial Cloaking of Very Large Objects", Applied Optics, 2014, vol. 53, No. 09, pp. 1-6.

Ichikawa, "Invisibility Cloaking Based on Geometrical Optics for Visible Light", Journal of the European Optical Society, 2013, vol. 08, pp. 13037-1-13037-4.

Meyen, "Parameters and Method to Evaluate the Solar Reflectance Properties of Reflector Materials for Concentrating Solar Power Technology", SolarPaces Guidelines, Version 2.5, 2013, pp. 1-38.

International Search Report for PCT International Application No. PCT/US2015/064664, dated Feb. 18, 2016, 5 pages.

\* cited by examiner

SYSTEM HAVING A TELECOMMUNICATIONS ELEMENT BEING CONCEALED BY A REFLECTIVE STRUCTURE COMPRISING A POLYMER OPTICAL MULTILAYER FILM

FIELD

The present description relates to a system having a concealed communications element and a method of concealing a communications element.

BACKGROUND

As the number of wireless subscribers continues to increase at a very high rate, wireless data traffic has also increased. The proliferation of new smart devices further fuels the wireless traffic growth. Media-rich applications such as video streaming in high density areas are increasing. Cellular sites must increase in capacity and number to keep up with the new demand. In order to deal with bandwidth requirements by geographical location, carriers are looking to add additional macro cell sites and to utilize small cell technology to increase capacity. Small cells may be deployed indoors or outdoors.

One of the challenges for macro cell sites and small cell deployments is the aesthetics associated with such equipment. For example, network planners must be sensitive to the appearance of macro sites deployed on building roof tops and of the additional small cell infrastructure being installed. A need exists therefore, to aid in improving aesthetics associated with macro cell sites and small cells and other communications elements being deployed currently.

SUMMARY

In one aspect, the present description relates to a system having a concealed communications element. The system includes a communications element, and a multilayer polymer optical film formed in a shape that at least partially surrounds the communications element and conceals it from view. The multilayer polymer optical film comprises a core layer that comprises a multilayer optical stack comprising two alternating polymeric layers, wherein the first polymeric layer comprises a birefringent material and the second polymeric layer comprises one of an acrylic-based polymer blended with a fluoropolymer or an acrylic-containing copolymer.

In another aspect, the multilayer optical film includes a core layer that comprises a multilayer optical stack comprising two alternating polymeric layers, where the specular reflectivity of light at 660 nm as reflected by the multilayer polymer optical film decreases less than 10% from its first exposure until after 12,750 hours of ISO 4892-2:2013 Cycle 4 weathering procedure.

In another aspect, the system comprises a multilayer polymer optical film comprising a core layer that comprises a multilayer optical stack comprising two alternating polymeric layers, wherein the b* yellowness index of the multilayer polymer optical film changes by less than 3 from its first exposure until after 12,750 hours of ISO 4892-2:2013 Cycle 4 weathering procedure.

In another aspect, the system comprises a non-metallic multilayer polymer optical film comprising a core layer that comprises a multilayer optical stack comprising two alternating polymeric layers.

In yet another aspect, the present description relates to a method of concealing an outdoor communications element. The method includes at least partially surrounding the outdoor communications element with a reflective multilayer optical film, such that the multilayer optical film conceals the communications element from viewers, and reflects ambient light towards viewers, the multilayer optical film comprising a core layer that comprises a multilayer optical stack comprising two alternating polymeric layers, and a UV stable protective layer.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on," "connected to," "coupled with," "stacked on" or "in contact with" another element, component or layer, it can be directly on, directly connected to, directly coupled with, directly stacked on, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As noted above, the proliferation of wireless subscribers and corresponding data traffic is creating a need for installation of macro cell sites and small cells in order to keep up with network capacity demands. Small cell, roof top mounted macro antennas and equipment, and other commonly installed telecommunication elements offer the challenge of potentially being less than aesthetically pleasing to passersby an installation point. There therefore exists a need to better conceal the small cells (and other types of communications equipment) from onlookers. The present description provides such a solution.

Figure 1:
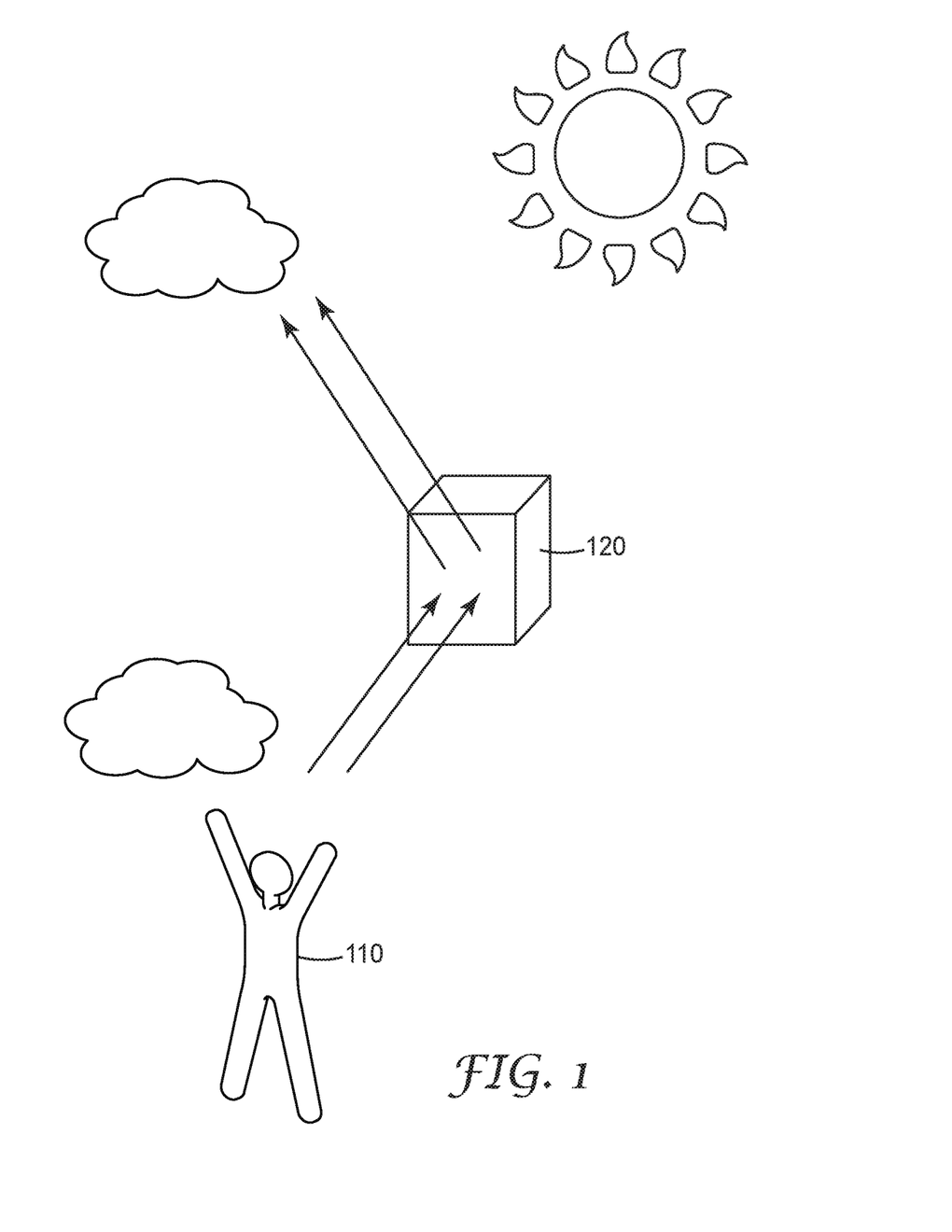
FIG. 1 is a basic diagram illustrating the function of the present system having a concealed telecommunication element.

At its most fundamental level, the present description provides for a system that conceals communications elements from onlookers. The system utilizes a highly specular reflective structure (in particular, a multilayer polymer optical film) that surrounds the communications element, and hides it by reflecting ambient light and reflections of the surroundings of the system towards a viewer that is looking at the system. Alternatively, the structure may be highly specular and only partially reflective, where a substrate behind the structure can absorb any transmitted light (or only slightly scatter it), where such a substrate is positioned between the multilayer optical film and the communications element. A simple illustration of this is provided in FIG. 1, with reflective structure 120 and viewer 110, where the communications element is hidden by structure 120. The communications element that is being hidden may, in some embodiments, be or include an antenna, for example a multiband directional antenna by Commscope model SBNH-1D6565B (Commscope, Inc., Hickory, N.C.), or Kathrein model 840 10525 (Kathrein-Werke K G, Rosenheim, Germany). In some embodiments, the communications element may be an element that includes both an antenna and a radio, for example an Ericsson (Stockholm, Sweden) Antenna Integrated Radio model AIR21 B1 or Alcatel Lucent model 9768 Metro Radio Outdoor (Alcatel Lucent, Boulogne-Billancourt, France). In another embodiment, the element may be a small cell antenna, for example a Commscope antenna model NH360QS-DG-FOM, or Antenna Products antenna model AWS360DP-1710-10-TO-D-A3 (Antenna Products Corp., Mineral Wells, Tex.). In another embodiment, the communications element may be an antenna and radio used for wireless backhaul, for example a 60 GHz wireless Ethernet bridge GE60 (Bridge-Wave, Santa Clara, Calif.).

The polymer films described herein are used outdoors and subject to continuous exposure to the elements. Consequently, a technical challenge in designing and manufacturing non-metalized polymer reflective films is achieving long-term (e.g., 20 years) durability when subjected to harsh environmental conditions. Mechanical properties, specular reflectivity, corrosion resistance, ultraviolet light stability, and resistance to outdoor weather conditions are some of the factors that can contribute to the gradual degradation of materials over an extended period of operation.

Figure 2:
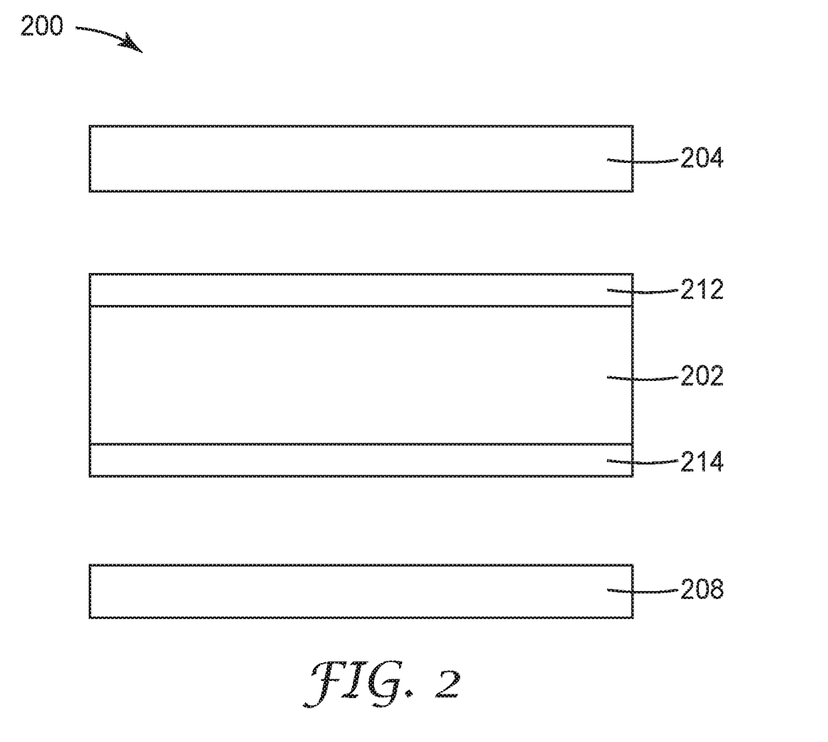
FIG. 2 is a cross-sectional view of a multilayer polymer optical film according to the present description.

A simple diagram of a multilayer polymer optical film 200 that may be used in the present description is provided in FIG. 2. The first element of the multilayer polymer optical film is a core layer 202 that is made up of a multilayer optical stack. The multilayer optical stack of core layer 202 includes two alternating polymeric layers. The multilayer polymer optical film may optionally also include a protective layer 204 (for example, a hardcoat or an over laminate) that is positioned between the viewer and the core layer. As will be described in greater detail below, the protective layer 204 may include one or more UV absorbers to aid in durability of the multilayer polymer optical film against UV-degradation.

Multilayer polymer optical film 200 may optionally also include an adhesive layer 208 that is positioned between the core layer 202 and a surface onto which the multilayer polymer optical film is to be adhered (not shown). When adhered to such a surface the multilayer polymer optical film may conform to said surface's shape. In a number of embodiments, in order to aid the multilayer polymer optical film in concealing the communications element it will surround, the multilayer polymer optical film will be formed into a three-dimensional shape. Any appropriate three-dimensional shape may be chosen, for example, in one embodiment the multilayer polymer optical film may be formed into a cylindrical shape. In another embodiment, the multilayer polymer optical film may be formed into a hemispheric shape. When used herein, the expression "formed into" may mean that the film is in fact itself formed into that shape as a freestanding element, or is applied onto another substrate or device that is of the desired shape (e.g., applied onto a hemispheric substrate), or onto the communication device itself.

Multilayer polymer optical film 200 may further include a first outer layer 212 made up of one or more polymers that is positioned between the core layer 202 and hardcoat 204. The first outer layer should be considered a separate layer from the core layer. Additionally, the polymer optical film may include a second outer layer 214 that includes one or more polymers, the second outer layer positioned between the core layer 202 and the adhesive layer 208 (where present). The second outer layer should also be considered a layer separate from the core layer. Additionally, in at least one embodiment, at least one of the polymers in the first outer layer will not be present in the second outer layer, and at least one of the polymers in the second outer layer will not be present in the first outer layer. A more extensive description of each of the layers of the multilayer polymer optical film will now be provided.

Protective Layer

The protective layer is optional. In certain embodiments, in order to protect the multilayer optical film, the exposed surface of the film can be protected with an additional layer that can be coated, co-extruded, or laminated onto the first outer layer. In one embodiment, the first outer layer can be coated with a scratch and wear resistant hardcoat. The protective layer 204 can improve the durability and weatherability of the multilayer optical film during processing and during use of the end product. The hardcoat layer can include any useful material, such as acrylic hardcoats, silica-based hardcoats, siloxane hardcoats, melamine hardcoats, and the like. In the case of acrylic hardcoats, the hardcoat can contain one or more acrylic polymers. Acrylic polymers include acrylates, methacrylates, and their copolymers. In one embodiment, the hardcoat comprises more than 90% (weight percent on a dry basis) of acrylic polymers. In another embodiment, the hardcoat comprises a blend of 1,6-Hexanediol diacrylate (HDDA), which can be available from Sartomer USA, LLC, and BASF Paraloid B44. In another embodiment, the hardcoat comprises a poly(methyl methacrylate) polymer or copolymer, at least 80% of an acrylate or diacrylate monomer, and a stabilizer against ultraviolet light. The final coating is obtained by light curing the hardcoat formulation. Examples of such compositions are described in US 2015/0037567, incorporated by reference herein in its entirety. In another embodiment, the protective layer may comprise a surface protection film (e.g., overlaminate). Examples include, but are not limited to, 3M™ Scotchcal™ Gloss Overlaminates and Scotchgard™ Graphic and Surface Protection Film.

The hardcoat can be any useful thickness such as, for example, from 1 to 20 micrometers, or 1 to 10 micrometers, or 1 to 5 micrometers, or from 5 to 10 micrometers, or from 8 to 12 micrometers. In one embodiment, the thickness of the hardcoat is 9 micrometers. In another embodiment, the thickness of the hardcoat is 10 micrometers.

In one embodiment, the hardcoat layer can include UV stabilizers (see below), anti-oxidizers, such as TINUVIN 123, available from BASF Corporation, and the crosslinking agents and initiators necessary to cure the hardcoat polymers, such as, for example, IRGACURE 184, and IRGACURE 819, also available from BASF Corporation. In one embodiment, the hardcoat comprises from 1 to 7% of UV stabilizers (weight percent on a dry basis). In another embodiment, the hardcoat comprises from 2 to 6% of UV stabilizers (weight percent on a dry basis). In other embodiments, the hardcoat comprises 6% or less, or 5% or less, or 4% or less, or 3% or less of UV stabilizers in weight percent on a dry basis. In another embodiment, the hardcoat may comprise a stabilizer, such as Tinuvin CarboProtect, available from BASF, to protect the film from degradation in the UV/visible region from 380-420 nm). The nature of the hardcoat or any other protective layer is not critical to the performance of the multilayer optical film as a mirror film and the inventors envision that known clear hardcoats or protective layers may be used adjacent the first outer layer of the multilayer optical film. Those skilled in the art will recognize that a coated priming layer or other surface treatment may be utilized to achieve adequate adhesion between the protective layer and the outer layer(s).

Outer Layers

An outer layer (e.g. 212, 214) may be coextruded on each of the major surfaces of the multilayer stack during its manufacture to provide desirable properties to the multilayer optical stack and to protect it from shear along the feedblock and die walls.

In some embodiments, the outer layers 212, 214 may comprise a blend of one or more acrylate polymers and one or more fluoropolymers. As used herein, acrylate polymers include acrylates, methacrylates, and their copolymers. Examples of such polymers include polyacrylates, polymethacrylates, such as poly (methyl methacrylate) (PMMA), either as homopolymers or copolymers, such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units.

In certain embodiments, the fluoropolymer used in the polymeric blend of an outer layer is a material that is capable of being extruded. In some embodiments, the fluoropolymer may be a partially fluorinated polymer. For example, the fluoropolymer may be either melt-processable such as in the case of polyvinylidene fluoride (PVDF), a terpolymer of tetrafluoroethylene, hexafluoropropylene and vinylidene fluoride (THV), and other melt-processable fluoroplastics, or may be non-melt processable such as in the case of modified polytetrafluoroethylene (PTFE) copolymers, such as a copolymer of tetrafluoroethylene and low levels of fluorinated vinyl ethers and fluoroelastomers. Fluoroelastomers may be processed before they are cured by injection or compression molding or other methods normally associated with thermoplastics. Fluoroelastomers after curing or crosslinking may not be able to be further processed. Fluoroelastomers may also be coated out of solvent in their uncrosslinked form. In one embodiment, the fluoropolymer blended with the acrylic polymer is PVDF.

In other embodiments, the fluoropolymer is a fluoroplastic including interpolymerized units derived from vinylidene fluoride (VDF) and fluoroethylene and may further include interpolymerized units derived from other fluorine-containing monomers, non-fluorine-containing monomers, or a combination thereof. Examples of suitable fluorine containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), vinyl fluoride, and fluorine-containing di-olefins such as perfluorodiallylether and perfluoro-1,3-butadiene. Examples of suitable nonfluorine-containing monomers include olefin monomers such as ethylene, propylene, and the like.

VDF-containing fluoroplastics may be prepared using emulsion polymerization techniques as described, e.g., in Sulzbach et al., U.S. Pat. No. 4,338,237 or Grootaert, U.S. Pat. No. 5,285,002, hereby incorporated by reference. Useful commercially available VDF-containing fluoroplastics include, for example, THV™ 200, THV™ 400, THV™ 5000, THV™ 610x fluoropolymers (available from Dyneon LLC, St. Paul, Minn.), KYNAR™ 740 fluoropolymer (available from Atochem North America, Philadelphia, Pa.), HYLAR™ 700 (available from Ausimont USA, Inc., Morristown, N.J.), and FLUOREL™ FC-2178 (available from Dyneon LLC).

Other examples of fluoropolymers include THV™ (a terpolymer of $CF_2=CF_2/CF_3CF=CF_2/CF_2=CH_2$), THE (a terpolymer of $CF_2=CF_2/CF_3CF=CF_2/CH_2=CH_2$), PVDF-HV (a copolymer $CF_2=CH_2$ (85 wt %) and $CF_3CF=CF_2$ (15 wt %)) and PVDF-CV (a copolymer of $CF_2=CH_2$ (85 wt %) and $CF_2=CFCl$ (15 wt %)).

In some embodiments, on a dry basis, the outer layer comprises from 50% to 70% of the one or more acrylate polymers and from 25% to 40% of the one or more fluoropolymer. In other embodiments, the outer layer comprises from 60% to 65% of the one or more acrylate polymers and from 30% to 35% of the one or more fluoropolymer. In other embodiments, the outer layer comprises 63% of the one or more acrylate polymers and 35% of the one or more fluoropolymer. In certain embodiments, the one or more acrylate polymers is PMMA and the one or more fluoropolymer is PVDF.

In some embodiments, the outer layer comprises additives, such as, for example, one or more UV stabilizers. In some embodiments, the outer layer comprises from 0 to 5% of a UV stabilizer. In some embodiments, the outer layer comprises 1%, or 2%, or 3%, or 4%, or 5% of a UV stabilizer. In other embodiments, the UV stabilizer is Tin-1600.

In certain embodiments, the first or second outer layer comprises one or more polyesters. In one embodiment, the polyesters include crystalline or semi-crystalline polyesters, copolyesters, and modified copolyesters. In this context, the term "polyester" includes homopolymers and copolymers. Polyesters suitable for use generally include carboxylate and glycol subunits and can be generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester include, for example, terephthalic acid; isophthalic acid; 2,6-naphthalene dicarboxylic acid and isomers thereof; phthalic acid; azelaic acid; adipic acid; sebacic acid; norbornene dicarboxylic acid; bi-cyclo-octane dicarboxylic acid; 1,4-cyclohexane dicarboxylic acid and isomers thereof; t-butyl isophthalic acid, trimellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups.

Suitable glycol monomer molecules for use in forming glycol subunits of the polyester include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; Bisphenol A; 1,8-dihydroxy biphenyl and isomers thereof; and 1,3-bis (2-hydroxyethoxy) benzene.

An exemplary polymer useful as the outer layer of the present disclosure is polyethylene terephthalate (PET). Another useful birefringent polymer is polyethylene naphthalate (PEN). In one embodiment, the one or more polyesters of the second outer layer are made of 100% PET.

In some embodiments, each of the outer layers has a thickness of from 6 micrometer to 12 micrometers. In some embodiments, each of the outer layers has a thickness of 9 micrometers. In some embodiments, each of the outer layers has a thickness of at least 10 micrometers, at least 50 micrometers, or at least 60 micrometers. Additionally, in some embodiments, each of the outer layers has a thickness no greater than 200 micrometers, no greater than 150 micrometers or no greater than 100 micrometers. In some embodiments, each of the outer layers has a thickness no greater than 5 micrometers.

Multilayer Optical Stack (Core Layer)

In one embodiment, the multilayer optical stack comprises alternating layers of at least one birefringent polymer and one second polymer. The multilayer optical stacks are generally a plurality of alternating polymeric layers, which can be selected to achieve the reflection of a specific bandwidth of electromagnetic radiation.

Materials suitable for making the at least one birefringent layer of the multilayer optical stack of the present disclosure include crystalline, semi-crystalline, or liquid crystalline polymers (e.g., polyesters, copolyesters, and modified copolyesters). In this context, the term "polymer" will be understood to include homopolymers, copolymers (e.g., polymers formed using two or more different monomers), oligomers and combinations thereof, as well as polymers, oligomers, or copolymers that can be formed in a miscible blend, for example, by co-extrusion or by reaction, including transesterification. The terms "polymer" and "copolymer" include both random and block copolymers.

Polyesters suitable for use in some exemplary multilayer optical stacks constructed according to the present disclosure generally include carboxylate and glycol subunits and can be generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclo-octane dicarboxylic acid; 1,4-cyclohexane dicarboxylic acid and isomers thereof; t-butyl isophthalic acid, trimellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; Bisphenol A; 1,8-dihydroxy biphenyl and isomers thereof; and 1,3-bis (2-hydroxyethoxy) benzene.

An exemplary polymer useful as the birefringent layer in the multilayer optical stacks of the present disclosure is polyethylene terephthalate (PET). Another useful birefringent polymer is polyethylene naphthalate (PEN). The molecular orientation of the birefringent polymer may be increased by stretching the material to greater stretch ratios and holding other stretching conditions fixed. Copolymers of PEN (coPEN), such as those described in U.S. Pat. Nos. 6,352,761 and 6,449,093 are useful for their low temperature processing capability making them more coextrusion compatible with less thermally stable second polymers. Other semicrystalline polyesters suitable as birefringent polymers include, for example, polybutylene 2,6-naphthalate (PBN) and copolymers thereof, as well as copolymers of polyethylene terephthalate (PET) such as those described in U.S. Pat. No. 6,449,093 B2 or U.S. Pat. Pub. No. 2006/0084780, which are incorporated herein by reference for their disclosure of birefringent polymers and polyesters. Alternatively, syndiotactic polystyrene (sPS) is another useful birefringent polymer.

The second polymer of the multilayer optical stack can be made from a variety of polymers having glass transition temperatures compatible with that of the first birefringent polymer and having a refractive index similar to the anisotropic refractive index (out of plane or $n_z$) of the birefringent polymer.

Examples of other polymers suitable for use in optical stacks as the second polymer include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer can be formed from homopolymers and copolymers of polyesters, polycarbonates, fluoropolymers, and polydimethylsiloxanes, and blends thereof.

For example, in one aspect, the first polymeric layer comprises a birefringent material and the second polymeric layer comprises an acrylic-based polymer blended with a fluoropolymer or an acrylic-containing copolymer. This construction can provide a core layer with an index of refraction difference between the first and second layers of about 0.19. For example, the first layer can comprise PET, which has a refractive index of about 1.57, where the refractive index in the length and width directions is about 1.65 and an anisotropic index ($n_z$) is about 1.49. The second polymer layer can comprise an acrylic-based polymer, such as PMMA, which has a refractive index of about 1.49, which is blended with a fluoropolymer, such as PVDF, which has a refractive index of about 1.42, resulting in a refractive index of about 1.46 for the blend. As a result, reflectance values for the multilayer optical stack can be very high.

Other exemplary suitable polymers, for use as the second polymer, include homopolymers of PMMA, such as those available from Ineos Acrylics, Inc., Wilmington, Del., under the trade designations CP71 and CP80, or polyethyl methacrylate (PEMA), which has a lower glass transition temperature than PMMA. Additional second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF).

Yet other suitable polymers, useful as the second polymer, include polyolefin copolymers such as poly (ethylene-co-octene) (PE-PO) available from Dupont Performance Elastomers under the trade designation Engage 8200, poly (propylene-co-ethylene) (PPPE) available from Fina Oil and Chemical Co., Dallas, Tex., under the trade designation Z9470, and a copolymer of atactic polypropylene (aPP) and isotatctic polypropylene (iPP). The multilayer optical stacks can also include, for example in the second polymer layers, a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

In one embodiment, polymer compositions suitable as the second polymer in alternating layers with the at least one birefringent polymer include PMMA, coPMMA, polydimethyl siloxane oxamide based segmented copolymer (SPOX), fluoropolymers including homopolymers such as PVDF and copolymers such as those derived from tetrafluoroethylene, hexafluoropropylene, and vinylidene fluoride (THV), blends of PVDF/PMMA, acrylate copolymers, styrene, styrene copolymers, silicone copolymers, polycarbonate, polycarbonate copolymers, polycarbonate blends, blends of polycarbonate and styrene maleic anhydride, and cyclic-olefin copolymers.

The selection of the polymer compositions used in creating the multilayer optical stack can be influenced by the desire to reflect a given bandwidth of incoming radiation. Higher refractive index differences between the birefringent polymer and the second polymer create more optical power thus enabling more reflective bandwidth. Alternatively, additional layers may be employed to provide more optical power. Examples of combinations of birefringent layers and second polymer layers may include, for instance, the following: PET/coPMMA, PET/THV, PET/SPOX, PEN/THV, PEN/SPOX, PEN/PMMA, PEN/coPMMA, coPEN/PMMA, coPEN/SPOX, sPS/SPOX, sPS/THV, CoPEN/THV, PET/fluoroelastomers, sPS/fluoroelastomers and coPEN/fluoroelastomers.

Exemplary multilayer optical stacks of the present disclosure may be prepared, for example, using the apparatus and methods disclosed in U.S. Pat. No. 6,783,349, entitled "Apparatus for Making Multilayer Optical Films," U.S. Pat. No. 6,827,886, entitled "Method for Making Multilayer Optical Films," and PCT Publication Nos. WO 2009/140493 entitled "Solar Concentrating Mirror" and WO 2011/062836 entitled "Multi-layer Optical Films," all of which are incorporated herein by reference in their entireties. Examples of additional layers or coatings suitable for use with exemplary multilayer optical stacks of the present disclosure are described, for example, in U.S. Pat. Nos. 6,368,699, and 6,459,514 both entitled "Multilayer Polymer Film with Additional Coatings or Layers," both of which are incorporated herein by reference in their entireties.

In some embodiments, the multilayer optical stack may have spectral regions of high reflectivity (>90%) and other spectral regions of high transmissivity (>90%). In some embodiments, the multilayer optical stack provides high optical reflectivity over a portion of the solar spectrum, low diffuse reflectivity, low yellowing, good weatherability, good abrasion, scratch, and crack resistance during handling and cleaning, and good adhesion to other layers, for example, other (co)polymer layers, applied to one or both major surfaces of the films when used as substrates.

In other embodiments, the average reflectance along each stretch direction at normal incidence over the wavelength region 380-1500 nm is greater than 90 percent, or greater than 95 percent, or greater than 98 percent, or greater than 99 percent.

In some alternative embodiments, the average reflectance along each stretch direction at normal incidence over the wavelength range from 380-1500 nm may be lower than the reflectance values for those embodiments described immediately above, but still greater than 50 percent, or greater than 60 percent. In these alternative embodiments, an appropriately colored dark substrate (potentially light absorbing or slightly scattering) can be positioned between the film and the object to be concealed. An example colored dark substrate can include 3M Film 1080-M12 (available from 3M Company).

Figure 3:
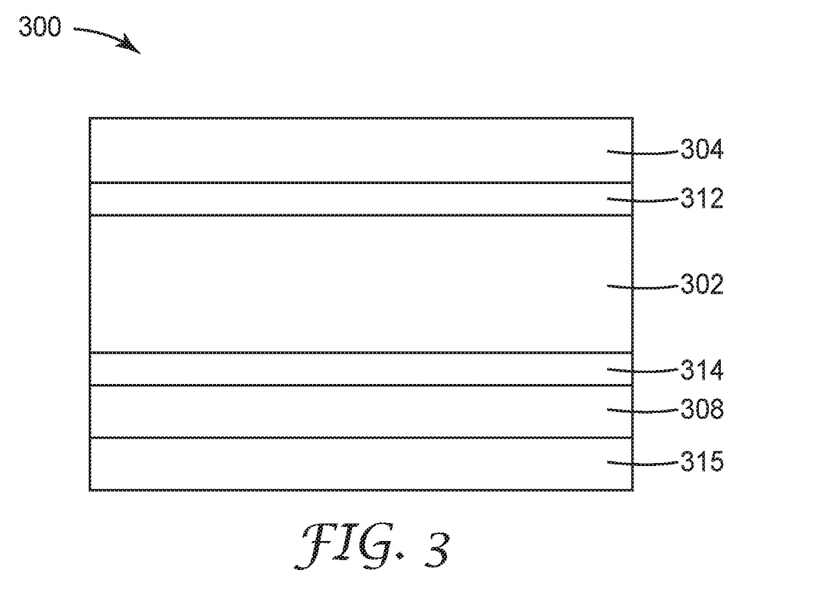
FIG. 3 is a cross-sectional view of a multilayer polymer optical film according to another embodiment of the present invention.

For example, FIG. 3 shows a multilayer polymer optical film 300 that that includes a colored dark substrate 315. Similar to that described above with respect to FIG. 2, a first element of the multilayer polymer optical film comprises a core layer 302 that is made up of a multilayer optical stack. The multilayer optical stack of core layer 302 includes two alternating polymeric layers. The multilayer polymer optical film 300 may optionally also include a protective layer 304 (for example, a hardcoat or an over laminate) that is positioned between the viewer and the core layer. The protective layer 304 may include one or more UV absorbers to aid in durability of the multilayer polymer optical film against UV-degradation.

Multilayer polymer optical film 300 can also include an adhesive layer 308 that is positioned between the core layer 302 and colored dark substrate 315, having a surface onto which the multilayer polymer optical film is to be adhered. When adhered to such a surface the multilayer polymer optical film may conform to the shape of substrate 315.

Multilayer polymer optical film 300 may further include a first outer layer 312 made up of one or more polymers that is positioned between the core layer 302 and hardcoat 304. The first outer layer can be considered a separate layer from the core layer. Additionally, the polymer optical film may include a second outer layer 314 that includes one or more polymers, the second outer layer positioned between the core layer 302 and the adhesive layer 308 (where present).

In other embodiments, the average reflectance at 60 degrees from the normal from 380-750 nm is greater than 80 percent, greater than 90 percent, greater than 95 percent, greater than 98 percent, or greater than 99 percent. A film that maintains high reflectivity over a wide range of angles of incidence and polarization produces reflected images that can effectively conceal the intended communication equipment.

In alternative embodiments, the average reflectance at 60 degrees from the normal from 380-750 nm may be a lower value than for those embodiments described immediately above, but still greater than 50 percent, or greater than 60 percent. For example, an appropriately colored dark substrate (potentially light absorbing or slightly scattering) can be positioned between the film and the object to be concealed. In those embodiments where the reflectivity is lower (e.g., 50%, or 60%, or 70%), the film can be placed over a dark background to maximize the concealment by specular reflection.

Adhesive Layer

The adhesive layer is optional. Where present, the adhesive layer adheres the multilayer construction to a substrate. In some embodiments, the adhesive is a pressure sensitive adhesive. As used herein, the term "pressure sensitive adhesive" refers to an adhesive that exhibits aggressive and persistent tack, adhesion to a substrate with no more than finger pressure, and sufficient cohesive strength to be removable from the substrate. Exemplary pressure sensitive adhesives include those described in PCT Publication No. WO 2009/146227 (Joseph, et al.), incorporated herein by reference. In at least one embodiment, the adhesive layer can have a non-uniform thickness. This non-uniform thickness may result in the entire multilayer film having slight undulations, which may result in beneficial haze (diffuse reflectivity) and specular reflectivity properties, and also may provide pathways for air to escape when the adhesive coated film is laminated to a substrate.

For ease of application, the non-uniform adhesive layer may comprise air bleed channels and standoffs such as embodied in 3M ControlTac and 3M Comply adhesives (available from 3M Company).

UV Stabilizers

In some embodiments, the first outer layer or the protective layer, such as the hardcoat, independently of each other, may comprise a stabilizer such as a UV absorber (UVA) or hindered amine light stabilizer (HALS). In another embodiment, the hardcoat may comprise a stabilizer, such as Tinuvin CarboProtect, available from BASF, to protect the film from degradation in the UV/visible region from 380-420 nm).

Ultraviolet absorbers function by preferentially absorbing ultraviolet radiation and dissipating it as thermal energy. In one embodiment, the UVA includes TINUVIN 477 and TINUVIN 479, available from BASF Corporation. Other suitable UVAs may include: benzophenones (hydroxybenzophenones, e.g., Cyasorb 531 (Cytec)), benzotriazoles (hydroxyphenylbenzotriazoles, e.g., Cyasorb 5411, Tinuvin 329 (Ciba Geigy)), triazines (hydroxyphenyltriazines, e.g., Cyasorb 1164), oxanilides, (e.g., Sanuvor VSU (Clariant)) cyanoacrylates (e.g., Uvinol 3039 (BASF)), or benzoxazinones. Suitable benzophenones include, CYASORB UV-9 (2-hydroxy-4-methoxybenzophenone, CHIMASSORB 81 (or CYASORB UV 531) (2 hyroxy-4 octyloxybenzophenone). Suitable benzotriazole UVAs include compounds available from Ciba, Tarrytown, N.Y. as TINUVIN P, 213, 234, 326, 327, 328, 405 and 571, and CYASORB UV 5411 and CYASORB UV 237. Other suitable UVAs include CYASORB UV 1164 (2-[4,6-bis(2,4-dimethylphenyl)-1,3,5-triazin-2yl]-5(oxctyloxy) phenol (an exemplary triazine), CYASORB 3638 (an exemplary benzoxiazine), Tin-1600, and SUKANO UV MASTERBATCH TA11-10 MB03.

Hindered amine light stabilizers (HALS) are efficient stabilizers against light-induced degradation of most polymers. HALS do not generally absorb UV radiation, but act to inhibit degradation of the polymer. HALS typically include tetra alkyl piperidines, such as 2,2,6,6-tetramethyl-4-piperidinamine and 2,2,6,6-tetramethyl-4-piperidinol. Other suitable HALS include compounds available from Ciba, Tarrytown, N.Y. as TINUVIN 123, 144, and 292.

The UVAs and HALS disclosed explicitly here are intended to be examples of materials corresponding to each of these two categories of additives. The present inventors contemplate that other materials not disclosed here but known to those skilled in the art for their properties as UV absorbers or hindered amine light stabilizers can be used in the films of this disclosure.

Wireless Signal Transmission

As mentioned earlier, a goal of the presently described embodiments is to provide a system that conceals unsightly communications elements (such as small cell antennas, macro cell antennas, or radios) from onlookers by reflecting ambient light towards viewers. The use of a polymer film as the reflective device allows the benefit of conformability into a three-dimensional shape, which can have a curved or non-planar shape, such as a cylinder or hemisphere. Such shapes may be beneficial as they tend to reduce the image size of objects reflected near the communications element and can defocus direct reflection of sun towards the viewer.

One other benefit of many of the presently described embodiments is the ability to avoid interference with the radio signals being transmitted from or received by the communications element. Accordingly, the multilayer polymer optical film of the embodiments of the invention is non-metallic, or at least substantially non-metallic (i.e., no more than a trace amount of metal or inherent metallic impurities). As such the multilayer polymer optical film will be highly transmissive (i.e. at least 90% transmissive) of radio frequencies in the band that the communications elements receives and/or transmits signals. In one embodiment, the multilayer polymer optical film will be at least 90% transmissive of signals from about 400 MHz to about 10 GHz or potentially at least 90% transmissive of signals from about 400 MHz to about 100 GHz.

The dissipation of electromagnetic energy in a dielectric material can be can be related to the imaginary component of the relative permittivity of the material. This dielectric loss can be described by an electric field loss tangent (tan δ), which, for low loss materials, is the ratio of the imaginary part of the permittivity to the real part of the permittivity. Accordingly, multilayer polymer optical films of the present invention are measured to have a low loss tangent. For example, in one embodiment, the loss tangent (tan δ) is measured as 0.022 at 1.1 GHz, 0.018 at 2.5 GHz, and 0.016 at 5.6 GHz using a known method such as the split post dielectric resonator measurement technique described in IEC 61189-2-72. For low loss dielectric materials, the electromagnetic power P decays through the material as $P=P_o \exp\{-k\delta z\}$, where $P_o$ in the initial power, z is the propagation length through the material, and k is the wavenumber. In one embodiment, z=0.12 mm and the insertion loss ($10 \log_{10}\{\exp-k\delta z\}$) computed from the loss tangent measurements is less than 0.005 dB.

In other embodiments, the insertion loss can be less than about 0.01 dB.

Alternatively, one or more supplemental metal layers can be used in combination with the multilayer polymer optical film for example, as a frequency selective filter or directional EMI shielding.

The multilayer polymer optical film of the present invention can also be designed to have low back-reflection or return loss properties for wireless signals incident on the film. The low back reflection properties can be achieved, for example, by having a film with a low dielectric constant, by closely matching the dielectric constant of the substrate that the film will be placed on, or by making the film electrically thin as compared with the wavelength of the wireless signal. For embodiments that include concealment of an antenna, the dielectric constant of the multilayer film can be made to be close to the dielectric constant of the communications element, e.g., an antenna or radome. In one embodiment, the dielectric constant of the multilayer polymer optical film is 2.8 at 1.1 GHz. The radomes for antennas can be made from structural materials such as fiberglass, polycarbonate, ABS, PVC, or other materials whose dielectric constants range from about 2.0 to about 4.5. Many antennas for communication systems are designed to have return loss values less than about −10 dB, or less than about −15 dB, or less than about −20 dB over their operating frequency range. When the multilayer optical film of embodiments of the present invention is placed on the radome of a standard antenna, the return loss of the antenna remains largely unchanged.

The multilayer polymer optical film of embodiments of the present invention can also be designed not to generate new frequency components when high power wireless signals are transmitted through the film. This non-linear phenomenon, known as passive intermodulation distortion (PIM), occurs when two or more frequencies mix together to produce sum and difference frequencies and can be detrimental to the performance of a communication system. PIM may be measured using a known method, such as that found in IEC 62037 "Passive RF and Microwave Devices, Intermodulation Level Measurement". For an antenna covered or partially covered by the multilayer polymer optical film of the present invention, the PIM rating of the antenna remains largely unchanged. The PIM rating of the film covered antenna measured with 2 tones with 20 W power in each tone is measured to be less than −140 dBc. Thus, the multilayer polymer optical film can be suitable for use in communication systems transmitting high power (greater than 0.1 W, or greater than 1 W, or greater than 10 W) signals.

Weathering Stability

A standard multilayer optical film may suffer the drawback of degrading over time, and taking on unsightly "yellowing" characteristics, as well as losing reflectivity. It also may suffer degradation from exposure to harsh environmental conditions (wind, rain, hail, dirt, etc.). The presently described multilayer polymer optical film construction reduces these concerns using the constructions noted in detail earlier.

In order to quantify the amount of "yellowing" and thus degradation that occurs with a given film, one may measure the reflection of light by the film and then calculate the color of the reflected light in the well-known CIE L*a*b* color space. Some instruments can do this measurement directly. The b* value is a general indication of yellowness, with higher positive values representing increased yellowness. In this application, we refer to the "b* yellowness index" in order to make clear that we are using this method as a gauge of the yellowness of the light that reflects from the film. However, as noted, the films are also highly weatherable. The b* yellowness index of the multilayer optical films will certainly exhibit a value of less than 15, though it should exhibit a value of less than 12, and may exhibit a value of less than 8 after 12,750 hours of ISO 4892-2:2013 Cycle 4 weathering testing (without inclusion of water spray) on a film that has not previously been exposed to weathering (i.e. "previously unexposed"). ISO 4892-2:2013 Cycle 4 weathering testing involves a method for exposing specimens to xenon-arc light to reproduce weathering effects that occur when materials are exposed in actual end-use environments to daylight. The b* yellowness index of the exemplary multilayer optical films described herein will generally change (e.g., increase) by less than 3, or potentially less than 2 from its first exposure until after 12,750 hours of ISO 4892-2:2013 Cycle 4 weathering testing (without inclusion of water spray). For b* values referenced in the written description and claims, the b* value presumes a 10 degree observation angle, and D65 illuminant. For the sake of clarity, any reference to ISO 4892-2:2013 Cycle 4 weathering testing in the description or claims of the present application should be understood to reference a cycle without inclusion of water spray.

It will also be understood that in order to perform most effectively, the multilayer polymer optical film of the present description may have very high reflectivity of light in the visible spectrum (e.g. greater than 90%, or 95%). Alternatively, the multilayer polymer optical film of the present description may have a lower reflectivity (e.g., greater than 50%, or greater than 60%) but have an appropriate RF, mm-wave, or microwave transparent substrate positioned behind the film that either absorbs light transmitted through the film, or slightly scatters the incident light and reflects it towards the viewer (directing the light once again through the polymer film) such that light ultimately reflected by the film and reaching a viewer exhibits appropriate diffuse reflectivity and specular reflectivity values. The multilayer optical film of embodiments of the present invention can have a specular reflectivity of greater than 80%, or potentially greater than 85% or even greater than 90%. Appropriate diffuse reflectivity values for the multilayer polymer optical film construction of embodiments of the present invention can be less than 20% or less than 15%, or less than 10%, or less than 5%, or potentially less than 3% diffuse reflectivity. Appropriate diffuse reflectivity and specular reflectivity values are important because a heightened specular reflectivity can allow for a sharper and more accurate depiction of the reflection image, and lower diffuse reflectivity and lower Lambertian component of high angle scattering can ensure that there is not a "whitening" of the reflected image. It may in some embodiments, however, be desirable to ensure that specular reflectivity values, while greater than 80%, do not approach 100%, as a slight imperfection in specular reflectivity may allow "softening" of reflected images that one does not want a viewer to focus on, e.g., the edges of an object around which the film is positioned. Additionally, an engineered balance between specular and a small diffuse reflectivity may provide a significant reduction in the intensity of direct sun reflections.

Another important measure of the weatherability of a reflective film is its specular reflectivity after exposure to harsh conditions, which in essence provides a measure of the light scattering properties of the film. Specular reflectivity is the ratio of the quantity of the specular component of reflected light to the total quantity of reflected light from the surface. Specular reflectivity may be measured using a known method, such as that found in Solar Paces "Method to Evaluate the Solar Reflectance Properties of Reflector Materials for Concentrating Solar Power Technology." Version 2.5, June 2013. The specular component of the reflected light is the portion contained within 20 milliradians of the specular direction as defined in the law of reflection. The multilayer polymer optical film constructions described herein exhibit excellent specular reflectivity even after extensive weathering testing. Specifically, specular reflectivity of light at 660 nm as reflected by the multilayer polymer optical films of the present description decrease less than 10%, less than 5.0%, less than 1.0%, or less than 0.5% when comparing specular reflectivity before any weathering of the multilayer optical film and from its first exposure until after 12,750 hours of ISO 4892-2:2013 Cycle 4 weathering procedure (without inclusion of water spray).

In other aspects of the invention, specular reflectivity may be maintained as close to 100% as possible. In these aspects, it may be preferable to structure the surface of the film using a texture having macroscopic length scale. In this instance, the reflected light remains specular but is redirected in non-uniform directions due to the varying topography of the film surface.

Non-uniform specular reflection is to be understood as compared to diffuse reflection. High levels of diffuse reflection tend to make the reflected appearance of an object more white, that is, the color saturation of the reflected image is rapidly lost, whereas the specular reflectance provided by a macroscopic texture is largely color preserving. With appropriate macroscopic texture, reflected color is preserved, while reflected shape is not. This configuration can be a great advantage in concealment because shape retention is frequently not desired, while color retention is typically important. Additionally, such structure may be useful in reducing the intensity of direct sun reflections.

Surprisingly, the investigators have found that in many instances, an effective concealment occurs when close to 100% specular reflection (at least about 85%, at least about 90%, and, in some aspects, at least about 95%) is maintained and the multilayer optical film is structured with a low amplitude, macroscopic pattern. Such a pattern can be embossed mechanically, thermally, with the aid of vacuum forming or by using any such technique that creates a permanent pattern in the film, including, for example, laminated structures. In this application, the word "embossing" or "embossed" is understood to mean any process by which the specular reflection from the film is distorted out of its original plane. For example, this includes reflective and refractive distortions. One dimensional or two dimensional patterns are possible, with two dimensional patterns being preferred. An acceptable size range for at least one of the dimensions of the individual structures is from about 1 mm to about 20 mm, with preferred sizes ranging from about 3 mm to about 10 mm. Structures smaller than this range can tend to start behaving as diffuse reflectors. Structures larger than this range may require too much amplitude to adequately distort the reflected image. Having two or more structure sizes or a continuous range of structures in the acceptable size range is acceptable. In some embodiments, all layers of the film construction are simultaneously embossed with the same pattern; in other embodiments, only the adhesive layer or the protective layer is embossed.

A high surface density of sharp local changes in the structure is to be avoided because such changes effectively create a high surface density of structure in the non-preferred size range. So for example, it is preferred that the change of slope anywhere on a structure as well as in regions between structures and connecting structures remains continuous (i.e. the curvature of the structure remains continuous). Moreover, in some aspects, it is greatly preferred that the surface of the structure be gently curved and that the curvature change relatively slowly. In this sense, a low amplitude sinusoidal structure or the like, for example, can be utilized, whereas a triangular structure, due to the presence of a discontinuous change in slope, would not be preferred. In alternative aspects, an aperiodic pattern can be utilized.

This preference can be understood in terms of a Fourier analysis of the aforementioned triangular structure. It is well known that a triangular structure can be constructed by superposition of distinct frequency components. However, to represent the discontinuity in curvature (or any high rate of change of slope), very high frequency components must be used. So when physically structuring the film with such features, it is as if the film were structured with features that are smaller than the preferred range of structure size.

The amplitude of the macroscopic structures relative to their planar extent on the film (that is, the maximum displacement of the structures out of the plane of the film or, in other words, the height/depth of the embossing relative to the size of the embossed structure) largely determines the change in the reflection angle relative to the angle expected from a reflection directly off of the original plane of the film. In some embodiments, it is preferred to minimize extreme departures of the reflected light relative to the angle expected from a reflection off of the original plane of the film. In such cases, the maximum amplitude of the embossed structure is preferred, but not limited, to be 30% or less than the in-plane length of the structure.

In some aspects, maintaining high mechanical flexibility of the optical multilayer film is important so that the film can be bent around an object, in particular, at ambient temperatures. In such cases, high amplitude embossing may make the film more rigid, thereby reducing the film's usefulness as a tool for concealing an object. In such cases, it is preferred to maintain the amplitude of the embossing to less than 15% or less than the in-plane length of the structure.

In other embodiments, an engineered balance between the specular reflection and diffuse reflection may be desired. This approach can serve to soften the clarity of reflections as well as reduce the intensity of direct sun reflections. In these embodiments, it is preferable that the diffuse reflection not exceed around 20%, more preferably not exceed around 15% and even more preferably not exceed around 10%.

In some embodiments, the engineered diffuse reflection may be induced by adding particulates to a part of the construction that is in the optical path. So for example, such particulate may be added to the hardcoat, or applied as a separate coating either over or under the hardcoat.

Preferred particulates for providing an engineered diffuse reflection may be selected from inorganic particles such as silica or talc or from organic particles such as PMMA or polystyrene or the like.

In some embodiments, it is preferred that the particles used to create an engineered diffuse reflection be generally larger than optical wavelengths. In such embodiments, the particles may behave more as lenslets rather than scatterers. This may reduce the relative amount of high angle scattering compared to low angle scattering. In such embodiments the clarity of the reflected image may be desirably reduced while still maintaining reflected color fidelity.

Preferred particles are generally in the size range of 1-25 microns. More preferred particles are generally in the size range of 3-20 microns. Even more preferred particles are generally in the size range of 4-16 microns.

The desired surface concentration of particles can vary based on several factors, including the level of engineered diffuse reflection desired, the size of the particles used, the thickness of the layer in which the particles are embedded and whether the particles are in the top layer or have been overcoated by a subsequent coating.

In some embodiments, a combination of an engineered diffuse reflection and embossing may also be used to provide a variety of desired reflection and concealing performance.

In some aspects, the multilayer optical film may be used as a shroud that partially or entirely conceals the object. If the concealed object generates heat (such as is the case with a small cell antenna with an integrated radio transmitter), the presence of a shroud may result in excessive heat buildup. In such cases, the film may contain a plurality of gaps, such as slits, or the film can be perforated with openings that greatly improve the air circulation past the small cell antenna, thereby reducing the heat buildup to acceptable levels. In some aspects, slit or perforation patterns can be those where the ratio of closed area to open area is about 70:30 or less and, in other aspects, slit or perforation patterns are those where the ratio of closed to open area is around 50:50.

The system described herein may be positioned at any appropriate position where a communications element may be positioned, so long as the benefit of the concealment properties of the film will be realized (i.e. where reflectivity of surroundings will be effective in concealing the element). For example, the system may be positioned on either the top or the side of a building, on a light pole or telephone pole, or in certain embodiments, on a ceiling or interior wall. For example, when the system is located outdoors and above the viewer, the reflected ambient light would come from the sky. In this example, a viewer looking at the system will see the reflected image of the sky, which will cause the system to be less visible and appear to blend in with the background light from the sky.

In another aspect, the present description relates to a method of concealing a communications element. The method includes at least partially surrounding the communications element with a reflective multilayer optical film, such that the multilayer optical film conceals the communications element from viewers, and reflects ambient light towards viewers. In a particular aspect, the reflective multilayer optical film is configured to be installed around the communications element at ambient temperatures. The multilayer optical film can comprise a UV stable protective layer, and the multilayer optical film can have a diffuse reflectivity of less than 20% and a specular reflectivity of greater than 80%. In one embodiment, the communications element is concealed by reflecting a sky backdrop. In one embodiment, the communications element may be an antenna, such as a small cell antenna or a macro cell antenna. In another aspect, the method can include a step of providing a communications element.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of concealing an outdoor communications element, wherein the communications element positioned on one of the top of a building, the side of a building, a light pole, a telephone pole, a ceiling, and an interior wall comprises at least one of an antenna, a radio, and a small cell antenna, comprising at least partially surrounding the outdoor communications element with a reflective non-metallic multilayer optical film, such that the multilayer optical film conceals the outdoor communications element from viewers, and reflects ambient light towards viewers, the multilayer optical film comprising a core layer that comprises a multilayer optical stack comprising two alternating polymeric layers, and a UV stable protective layer.

2. The method of claim 1, wherein the first polymeric layer comprises a birefringent material and the second polymeric layer comprises one of an acrylic-based polymer blended with a fluoropolymer or an acrylic-containing copolymer.

3. The method of claim 1, wherein a specular reflectivity of light at 660 nm as reflected by the multilayer polymer optical film decreases less than 10% from its first exposure until after 12,750 hours of ISO 4892-2:2013 Cycle 4 weathering procedure.

4. The method of claim 1, wherein a b* yellowness index of the multilayer polymer optical film changes by less than 3 from its first exposure until after 12,750 hours of ISO 4892-2:2013 Cycle 4 weathering procedure.

5. The method of claim 1, wherein an average reflectance along each stretch direction of the multilayer polymer optical film at normal incidence over the wavelength range from 380-1500 nm is greater than 50 percent and less than 90 percent.

6. The method of claim 1, further comprising a textured layer formed on top of the multilayer polymer optical film.

7. The method of claim 1, wherein the multilayer optical film comprises multiple gaps, wherein a gap pattern comprises a closed area to open area ratio of about 70:30 or less.

8. The method of claim 1, wherein the multilayer polymer optical film is formed into a non-planar three-dimensional shape.

9. The method of claim 1, wherein the multilayer polymer optical film has a specular reflectivity in the visible spectrum of greater than 80%.

\* \* \* \* \*